D. H. RANDALL & C. C. WHITCOMB.
STEERING GEAR FOR TRACTION ENGINES.
APPLICATION FILED APR. 22, 1908.
918,368.
Patented Apr. 13, 1909.
2 SHEETS—SHEET 1.
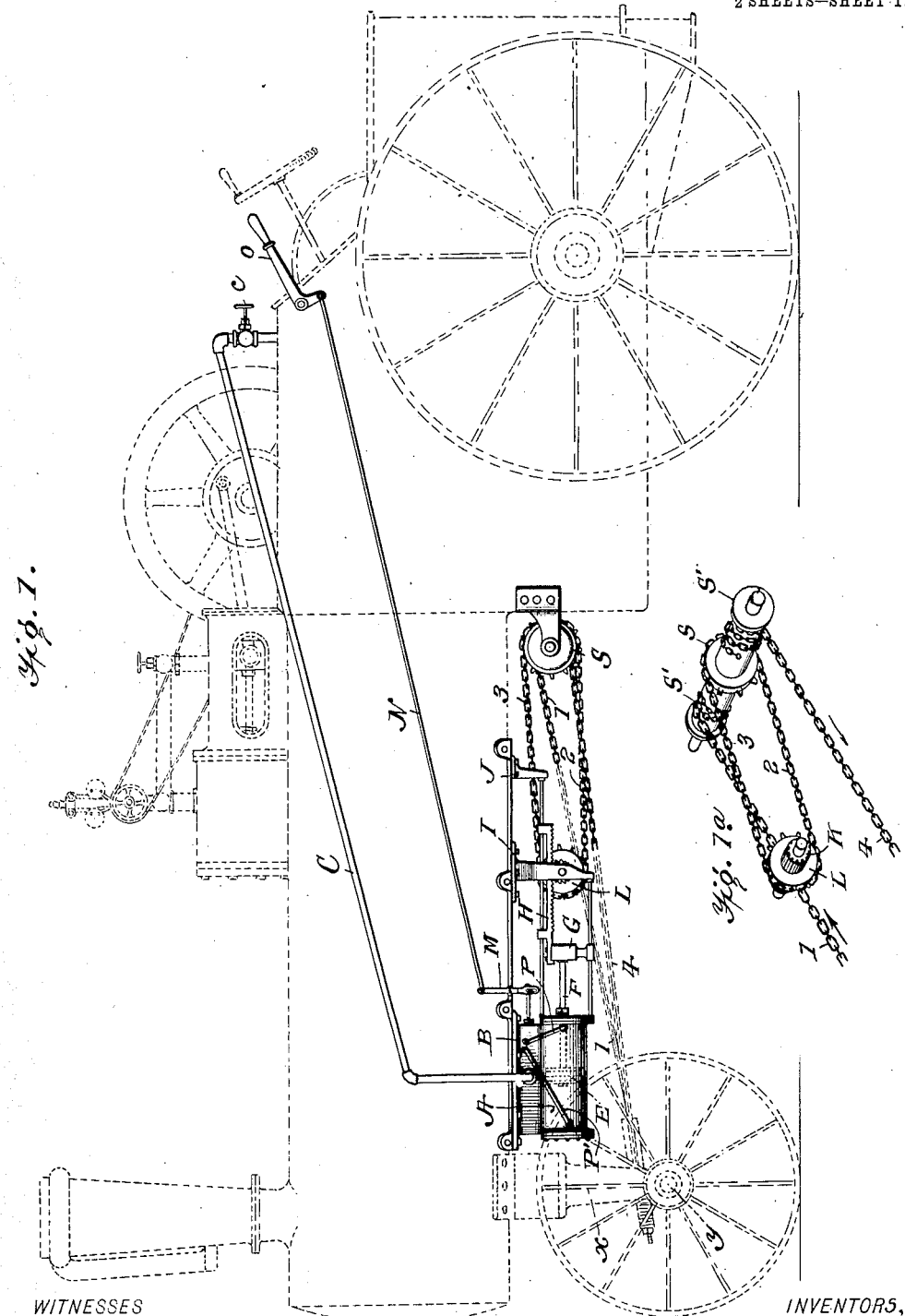
WITNESSES
INVENTORS,
Daniel H. Randall,
Charles C. Whitcomb,
BY
ATTORNEYS D. H. RANDALL & C. C. WHITCOMB.
STEERING GEAR FOR TRACTION ENGINES.
APPLICATION FILED APR. 22, 1908.
918,368.
Patented Apr. 13, 1909.
2 SHEETS—SHEET 2.
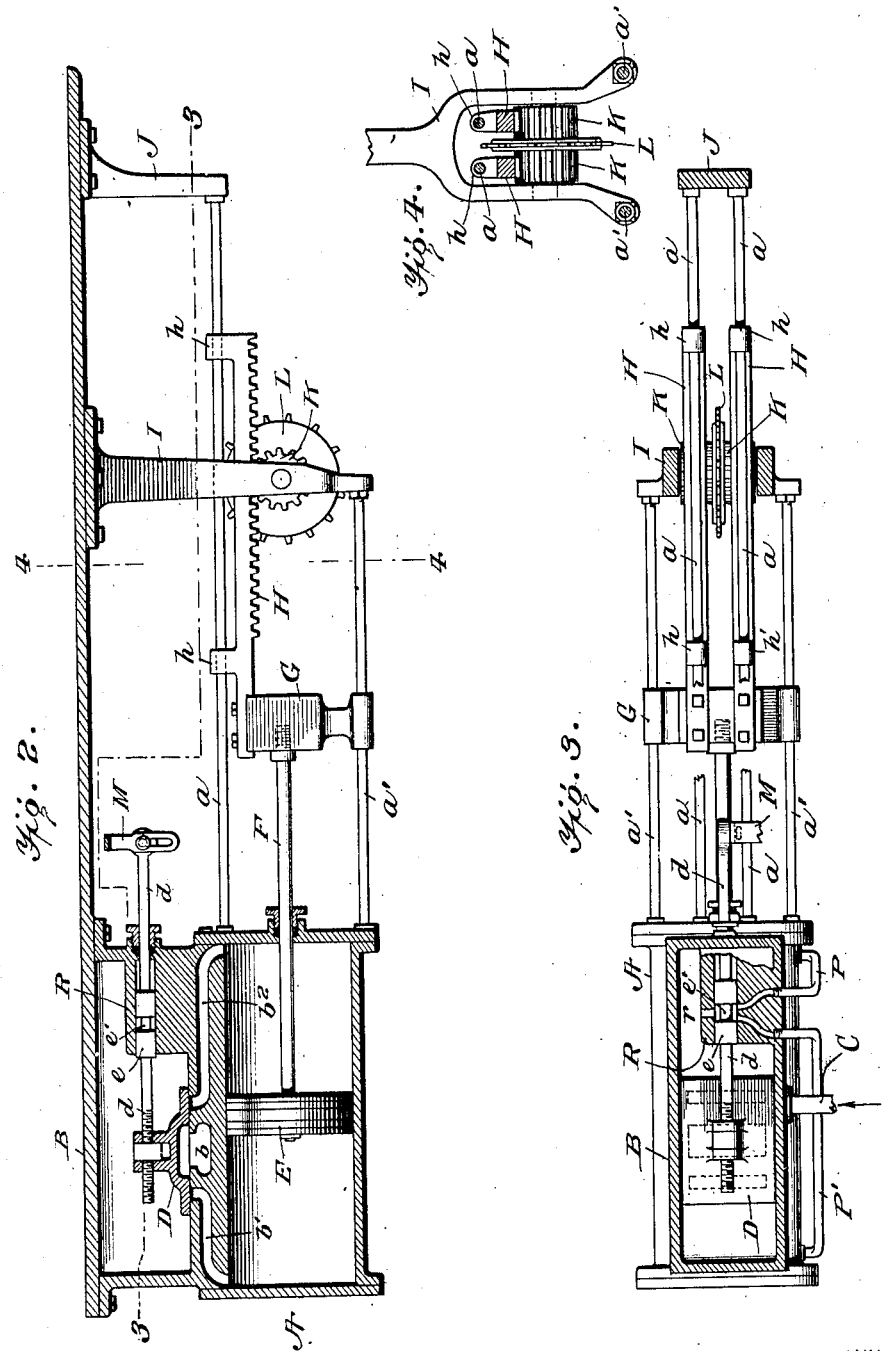
WITNESSES
INVENTORS,
DANIEL H. RANDALL,
CHARLES C. WHITCOMB,
BY
ATTORNEYS

UNITED STATES PATENT OFFICE.

DANIEL H. RANDALL AND CHARLES C. WHITCOMB, OF COON RAPIDS, IOWA.

STEERING-GEAR FOR TRACTION-ENGINES.

No. 918,368.  Specification of Letters Patent.  Patented April 13, 1909.

Application filed April 22, 1908. Serial No. 428,535.

To all whom it may concern:

Be it known that we, DANIEL H. RANDALL and CHARLES C. WHITCOMB, citizens of the United States, and residents of Coon Rapids, in the county of Carroll and State of Iowa, have made certain new and useful Improvements in Steering-Gear for Traction-Engines, &c., of which the following is a specification.

Our invention is in the nature of a steering gear designed more particularly for traction engines and motor vehicles, but applicable also to other uses. In such vehicles the usual method of steering is by a deflection of the front axle in a horizontal plane about its vertical kingbolt and it has been common heretofore to effect this deflection by the motor mechanism of a steam piston acting through a chain passing around pulleys to the opposite ends of said front axle.

Our invention belongs to this type of steering gear and consists in the novel construction and arrangement of parts whereby the axle is given its proper deflection and is also held in true position without accidental variation therefrom, as hereinafter more fully described with reference to the drawing, in which—

Figure 1 is a side elevation of our steering gear shown applied to a traction engine indicated in dotted lines. Fig. 1$^a$ is a perspective view showing the chain connections for the steering gear. Fig. 2 is an enlarged detail view, partly in section, of the steering gear. Fig. 3 is a plan view, partly in section on the line 3—3 of Fig. 2, and Fig. 4 is a vertical transverse section on line 4—4 of Fig. 2.

In the drawing, Fig. 1, $y$ represents the front axle and $x$ the vertical pivot by which the front end of the traction engine is mounted upon said front axle. For the purposes of steering, this front axle is given a deflection in a horizontal plane by a pull upon the chain 1 going to one end of the axle or upon the chain 4 going to the other end of the axle. When a pull is exerted upon the end 1 of the chain to give a deflection to the axle, the end 4 of the chain going to the other end of the axle is paid out as shown by the arrows in Fig. 1$^a$. The chain 1 is wound around a drum S' in one direction and the chain 4 is wound around the other end of the drum S' in the opposite direction and rigidly connected to this drum at an intermediate point is a sprocket wheel S. This sprocket wheel S is connected by an endless sprocket chain 2, 3, to a sprocket wheel L. By rotating the sprocket wheel L in opposite directions it will be seen that the sprocket wheel S, and consequently its drum S', S', will be turned so as to alternately take up one chain and pay out the other, and vice versa.

We will now proceed to describe the means by which motion is imparted to the sprocket wheel L for controlling the movement of the steering chains.

The sprocket wheel L is rigid with two gear wheels K, K, arranged on opposite sides of the same as seen in Fig. 4 and the axis of these wheels is carried by a forked hanger I secured at its upper end to the bottom of the boiler or the stationary frame of the engine. The lower legs of this forked frame are connected to two horizontal rods $a'$, $a'$, which extend to a steam cylinder A. On top of the gear wheels K, K, there slide two corresponding rack bars H, H, provided with guides $h$, $h$, on their upper sides, which embrace the two parallel rods $a$, $a$ which at one end are connected to a pendent rigid hanger J, and at the other end to the steam cylinder.

G is a cross head which is guided upon the lower rods $a'$, $a'$, and is bolted to the rack bars H, H. This cross head is attached to the piston rod F, which enters the cylinder A and is connected to and reciprocated by the piston E. As this cross head is reciprocated its rack bars H engaging the gear wheels K, give a rotary motion to the sprocket wheel L and thereby turn the endless chain 2—3, as shown in Fig. 1$^a$ so as to give it a movement in either direction.

D is an ordinary D-valve arranged within a steam chest B and adapted to alternately admit and exhaust steam from opposite ends of the cylinder in the usual well known manner. When the port $b'$ is uncovered by the valve to admit steam to the left hand side of the piston, the ports $b^2$ and $b$ are connected together by the valve to allow the escape of steam from the right hand side of the piston and vice versa. When, however, the valve is in the position shown in Fig. 2, both of the induction ports $b'$ and $b^2$ are covered and blanked. The valve D is reciprocated by means of a valve rod $d$ connected to the lower slotted end of a lever M, which in turn is connected by a rod N to an elbow lever O arranged in convenient position for access at the rear end of the engine. By means of this hand lever O, the valve is adjusted to any desired position.

It is easily seen that by the devices described, motion may be imparted through the piston and the chain to effect a deflection of the front axle in either direction. It is necessary, however, after making an adjustment, to hold this adjustment positively against any creeping or variation due to the leakage of steam in the cylinder, and when in straight running the front axle is adjusted at right angles to the line of draft, it is also necessary to so lock the running gear that the axle will not be accidentally deflected by the striking of one of its wheels against a rock or other obstruction in the road-way. To provide means for meeting these conditions, we have arranged in the steam chest a supplemental valve casing R, through which passes the valve rod $d$ and within the valve casing the rod $d$ is enlarged at $e$ and is provided with a transverse groove $e'$. On one side of the valve casing R is formed an opening $r$ and on the other side there are two passageways into which are tapped two pipes P, P', which extend to the opposite ends of the steam cylinder. When the piston E of the steering gear has been moved to the desired position by the adjustment of the valve D, after this position has been reached, the valve D is thrown by its handle lever to the blanked position shown in Fig. 2, which cuts off steam from both of the induction ports $b'$, $b^2$, and this same movement brings the groove $e'$ of the valve $e$ into alinement with the opening $r$ into the steam chest and the ports connecting with pipes P, P' on the opposite side. This allows live steam to pass from the steam chest through the pipes P, P' to the opposite ends of the cylinder and thus, by a positive pressure on both sides of the piston, holds the same to its adjusted position.

We claim—

1. The combination with a steering gear and a steam piston and valve for operating it; of a supplementary valve connected to and operated by the main valve rod, said supplementary valve being arranged to open live steam communication to both ends of the steam cylinder when the main steam ports are blanked.

2. The combination with a steering gear and a steam cylinder, piston, steam chest and valve; of a supplementary valve casing arranged within the steam chest and having a communicating opening with the same, a valve rod for operating the main valve having an enlarged portion extending through the supplementary valve casing and formed with a transverse groove adapted to register with the inlet to the supplementary casing and balancing pipes communicating with the supplementary casing and also with the opposite ends of the steam cylinder.

3. A steering gear comprising a steam cylinder, a steam piston and a main valve for operating it, a pivoted axle, means driven by said piston for turning said axle on its pivot, and a supplementary valve communicating with said cylinder and arranged to admit live steam at each end thereof for maintaining the piston in position and thereby locking the steering mechanism.

4. A steering gear comprising a pivoted axle, means for turning said axle, a steam cylinder and piston for operating said turning means, and means for admitting live steam on both sides of the piston for locking said axle in any position.

DANIEL H. RANDALL.
CHARLES C. WHITCOMB.

Witnesses:
MYRON PULVER,
GEO. D. SCOTT.